US005908135A

United States Patent [19]
Bradford et al.

[11] Patent Number: 5,908,135
[45] Date of Patent: Jun. 1, 1999

[54] SLEEVE PACK

[75] Inventors: Judson A. Bradford, Holland; Robert M. Zink, Grand Haven, both of Mich.

[73] Assignee: Bradford Company, Holland, Mich.

[21] Appl. No.: 08/560,212

[22] Filed: Nov. 21, 1995

[51] Int. Cl.[6] .............................. B31C 13/00; B65D 6/10; B65D 6/32; B65D 6/38

[52] U.S. Cl. .......................... 220/673; 220/62; 220/670; 220/679; 493/295

[58] Field of Search ........................................ 229/165, 182, 229/23 R, 939, 918, 940, 62; 206/386, 600, 4.12; 220/669, 670, 673, 679; 493/295; 264/248

[56] References Cited

U.S. PATENT DOCUMENTS

| | | | |
|---|---|---|---|
| 2,035,344 | 3/1936 | Robinson | 220/679 |
| 3,024,938 | 3/1962 | Watter . | |
| 3,030,246 | 4/1962 | Westlake, Jr. . | |
| 3,244,353 | 4/1966 | Miessler, Sr. | 229/939 |
| 3,327,883 | 6/1967 | Buhler | 220/4.12 |
| 3,404,051 | 10/1968 | Hall . | |
| 3,503,550 | 3/1970 | Main et al. | 229/122.32 |
| 3,910,485 | 10/1975 | Wandel | 229/939 X |
| 4,063,229 | 12/1977 | Welsh et al. | 206/807 X |
| 4,359,167 | 11/1982 | Fouss et al. | 220/565 X |
| 4,390,154 | 6/1983 | Ostler et al. | 229/939 |
| 4,624,379 | 11/1986 | Rothenbucher | 220/4.12 X |
| 4,725,507 | 2/1988 | Lescaut | 220/4.12 X |
| 4,853,053 | 8/1989 | Minjolle et al. . | |
| 5,048,689 | 9/1991 | McFarland | 229/939 |
| 5,217,140 | 6/1993 | Lindahl | 220/4.12 X |
| 5,381,892 | 1/1995 | Allen | 229/101 |
| 5,448,110 | 9/1995 | Tuttle et al. | 257/723 |
| 5,454,480 | 10/1995 | Morris | 220/679 X |

OTHER PUBLICATIONS

Petrie, Edward, "Joining the 'Engineering Plastics'", Adhesives Age, pp. 14–23 Aug. 1980.

*Primary Examiner*—Stephen Castellano
*Assistant Examiner*—Niki M. Eloshway
*Attorney, Agent, or Firm*—Wood, Herron & Evans, L.L.P.

[57] ABSTRACT

A sleeve pack to be used with a pallet base and cover to form a container for shipping bulk goods comprises four vertical walls arranged such that each vertical wall is orthogonal to two adjacent walls. At least one vertical wall of corrugated plastic is joined by an edge-to-edge butt welded seam. In a preferred embodiment of the present invention a vertical wall panel having vertically oriented corrugations is edge-to-edge butt welded with a corner piece of corrugated plastic having horizontally oriented corrugations to form a continuous one ply sleeve pack. An alternative embodiment of the present invention is a double thickness, corrugated plastic sleeve pack in which one thickness has horizontal corrugations for side impact resistance and the other thickness has vertically oriented corrugations for increased stacking strength but with all seams butt welded.

46 Claims, 3 Drawing Sheets

SLEEVE PACK

FIELD OF THE INVENTION

This invention relates generally to reusable containers and more specifically to an improved sleeve pack assembly of the type commonly used in combination with a pallet base and cover.

BACKGROUND OF THE INVENTION

Relatively large reusable containers are utilized by manufacturers to ship a variety of different products to their customers. For example, in the automobile industry, a plant assembling a particular automobile might utilize a number of different parts manufacturers. These manufacturers ship their respective parts to the plant in reusable containers where the parts are then assembled together into a finished automobile. The reusable containers are often returned to the parts manufacturers for use in further shipments.

Generally construction of such shipping containers includes a pallet base, a cover and sleeve pack which is situated between the base and the cover to form the sidewalls of the container. Such a design provides a versatile and lightweight shipping container which may be reused time and time again. The vast majority of sleeve packs used today are made of heavy grades of triple wall corrugated paper, such as paper in the 1,000 lb. bursting strength range. Such paper wall sleeve packs are functional if kept dry; however, as may be appreciated, moisture damages the strength of the paper wall and degrades the overall reliability of the sleeve pack. Accordingly, there is a need for a sleeve pack which can be stored outdoors as necessary when indoor storage space is not available.

Plastic sleeves have been utilized for weatherproof containers; however, even the existing sleeve packs of plastic have undesirable limitations. Specifically, if made of a single layer of plastic, the single layer of plastic making up the sleeves is not capable of achieving adequate stacking strength, and therefore, in many cases, the several sheets of the single wall plastic material have to be laminated together. Often even the laminated sheets are not strong enough to support the stacking loads required, and they have to be reinforced with another material. The increased number of sheets in strengthening layers increase the expense of the containers and the complexity of their assembly.

Sleeve packs, whether plastic or paper, generally require some sort of reinforcement at their corners to hold the sleeve pack sidewalls together and to provide adequate support for the stacked loads. Different mechanisms and techniques have been utilized to reinforce the corners of a sleeve pack.

One of the techniques used to reinforce the corners of a sleeve pack includes wrapping one of the sidewall panels of the sleeve pack over the adjacent sidewall panel, creating a two-ply corner. Two overlapping sidewall panels are then joined by adhering or sonic welding the outer face of the inner sidewall panel to the inner face of the outer sidewall panel where the two sidewall panels overlap. The result is a sleeve pack which has two-ply corners immediately adjacent one ply sidewalls.

A potential problem which occurs with such an overlapped corner sleeve pack is that a vertical side edge of the outer ply protrudes outwardly, and creates a snag which may catch clothes or the edge of a forklift. Another potential problem is that when placing such an overlapping corner sleeve pack into an outer channel of a pallet base of a sleeve pack assembly, the portion of the sleeve pack where the sidewall panels overlap often does not fit into the channel of a pallet base. Either the channel of the pallet base must be increased in size, creating a loose fit of the one-ply sidewalls inside the channel or the two-ply corners of the sleeve pack must be trimmed to fit inside the channel of the pallet base.

Another potential problem with a plastic sleeve pack having sonic welded overlapping corner sidewalls is that the sonic welds used to secure the overlapping portions of the sidewalls are spaced apart and may create a weak joint. If the overlapping portion of a sidewall panel is caught by a forklift the weld may tear, separating the wall panels of the sleeve pack. The contents inside the sleeve pack will then fall out of the sleeve pack assembly and the sleeve pack assembly must be reassembled.

Another potential problem with a plastic sleeve pack having overlapping sonic welded corner side walls is that it is difficult to make the sidewalls of the sleeve pack of accurate dimensions. The overlapping side wall panels are subject to slipping during the sonic welding process, resulting in sidewalls longer or shorter than desired.

Still another potential problem with plastic sleeve packs having overlapping sonic welded side wall panels is that because the sonic welds are spaced apart or separated, the seal is not always water-tight and water may enter between the welds of overlapping wall panels. Water inside the sleeve pack is undesirable because the moisture may corrode or rust the parts located inside the sleeve pack assembly.

Yet another potential problem encountered in the use of sleeve packs occurs because of the inability of the sleeve pack to withstand a horizontally impact force applied to one of the corners or sidewalls of the sleeve pack. As a result, when a forklift hits the sidewalls or corner of the sleeve pack, as often occurs, the sleeve pack sidewalls may collapse inwardly and become permanently deformed.

Still another potential problem with existing sleeve packs occurs in identifying product contained within the sleeve pack. Once a sleeve pack is inserted between a cover and a pallet base to make a sleeve pack assembly the sleeve pack assembly has no identifiable characteristics to mark or identify the contents inside the sleeve pack assembly. A manufacturer receiving multiple sleeve pack assemblies, each sleeve pack assembly containing different parts, must look through each individual sleeve pack assembly to find the particular part desired. Since many sleeve packs are reusable it is undesirable to mark the sleeve pack in any permanent way. The next use of the sleeve pack assembly may involve entirely different contents than the current shipment.

It has therefore been an objective of this invention to provide a sleeve pack which solves all of these potential problems.

Specifically, it has been an objective of this invention to provide a sleeve pack which has both stacking strength and side impact resilience.

It has been another objective of the present invention to provide a sleeve pack made of a continuous single ply of multiple ply board which fits snuggly inside the outer channel of the pallet base of a sleeve pack assembly.

It has been another objective of this invention to provide a sleeve pack which does not have overlapping sidewall panels but rather has adjacent sidewall panels joined together in the same plane in an edge-to-edge relationship so as to eliminate all of the problems associated with overlapping sidewall panels.

It has been another objective of the present invention to provide a sleeve pack which may be relatively inexpensively assembled from one continuous piece of corrugated plastic.

It has been yet another objective of the present invention to provide a sleeve pack assembly whose contents may be easily identified from a distance without disassembling or opening the sleeve pack.

SUMMARY OF THE INVENTION

The invention of the application which accomplishes these objectives comprises an improved corrugated plastic sleeve pack assembly in which all joined edges of the sleeve pack are joined by an edge-to-edge butt welded seam. In one preferred embodiment the sleeve pack itself has four rectangular vertical wall panels, each wall panel having an inside face, an outside face and two opposed vertical side edges. The rectangular vertical wall panels are arranged in a rectangular pattern, each wall panel being orthogonal to the adjacent two wall panels. Connecting adjacent wall panels are four corner pieces. Each corner piece comprises two corner panels and a connector panel permanently attached together. The corner and connector panels each have an inner and outer face and two opposed vertical side edges. The two corner panels of each corner piece are orthogonal to each other and the connector panel is at an obtuse angle to each corner panel. The two vertical side edges of each vertical wall panel are permanently affixed by a butt welded seam to a vertical side edge of a corner piece without the presence of any overlapped material.

In order to give the sleeve pack sufficient stacking strength, the wall panels are made of corrugated plastic with the corrugations being vertically oriented. The corner pieces are made of corrugated plastic with the corrugations being horizontally oriented to give the assembly resilience and shock absorbing capability.

In addition to the one ply sleeve pack having corner pieces abutting wall panels in an edge-to-edge relationship and welded thereto the sleeve pack assembly of the present invention may have two-ply wall panels. These two-ply sleeve packs have four wall panels, each wall panel having an inner ply and an outer ply of corrugated plastic, with one of the plies having vertically oriented corrugations and the other ply of the same wall panel having horizontally oriented corrugations. The inner and outer plies of each wall panel abut one another in a face-to-face relationship but generally are not welded in such orientation.

In one embodiment the two-ply sleeve pack of the present invention is assembled by welding four pieces of corrugated plastic together into a blank, two of the pieces having vertical corrugations and two of the pieces having horizontal corrugations. The blank is then folded along score lines in order to form the two ply sleeve pack of the present invention.

The inner ply of each wall panel of the two ply sleeve pack may extend downward inside the outer ply of the wall panel to the lower edge of the outer ply, making both the inner ply and the outer ply the same height. Alternatively, the inner ply may extend downwardly only a portion of the distance between the top and bottom edges or the height of the outer ply so as to give the upper portion of each wall panel of the sleeve pack greater strength and resistance to inward and outward flexing of the top edge of the sleeve pack as for example when a person grasps the opposed top edges of an empty sleeve pack to pick it up.

In each sleeve pack a radio frequency identification device is inserted in either a vertical wall panel or a corner piece so as to enable one to identify the contents inside the sleeve pack assembly without disassembling the sleeve pack assembly.

One of the very substantial advantages of this invention, whether the side walls are of one ply corrugated plastic or two ply corrugated plastic, is that derived from the use of the butt welded edge-to-edge seams of the sleeve pack. Because the edges are butt welded they never need be overlapped in order to be welded or otherwise secured together. This results in a very substantial material savings. Since material is a large portion of the cost of a sleeve pack this material reduction materially reduces the cost of the sleeve pack.

These and other objects and advantages of this invention will be more readily apparent from the following description of the drawings in which:

DETAILED DESCRIPTION OF THE PREFERRED EMBODIMENT

Figure 1:
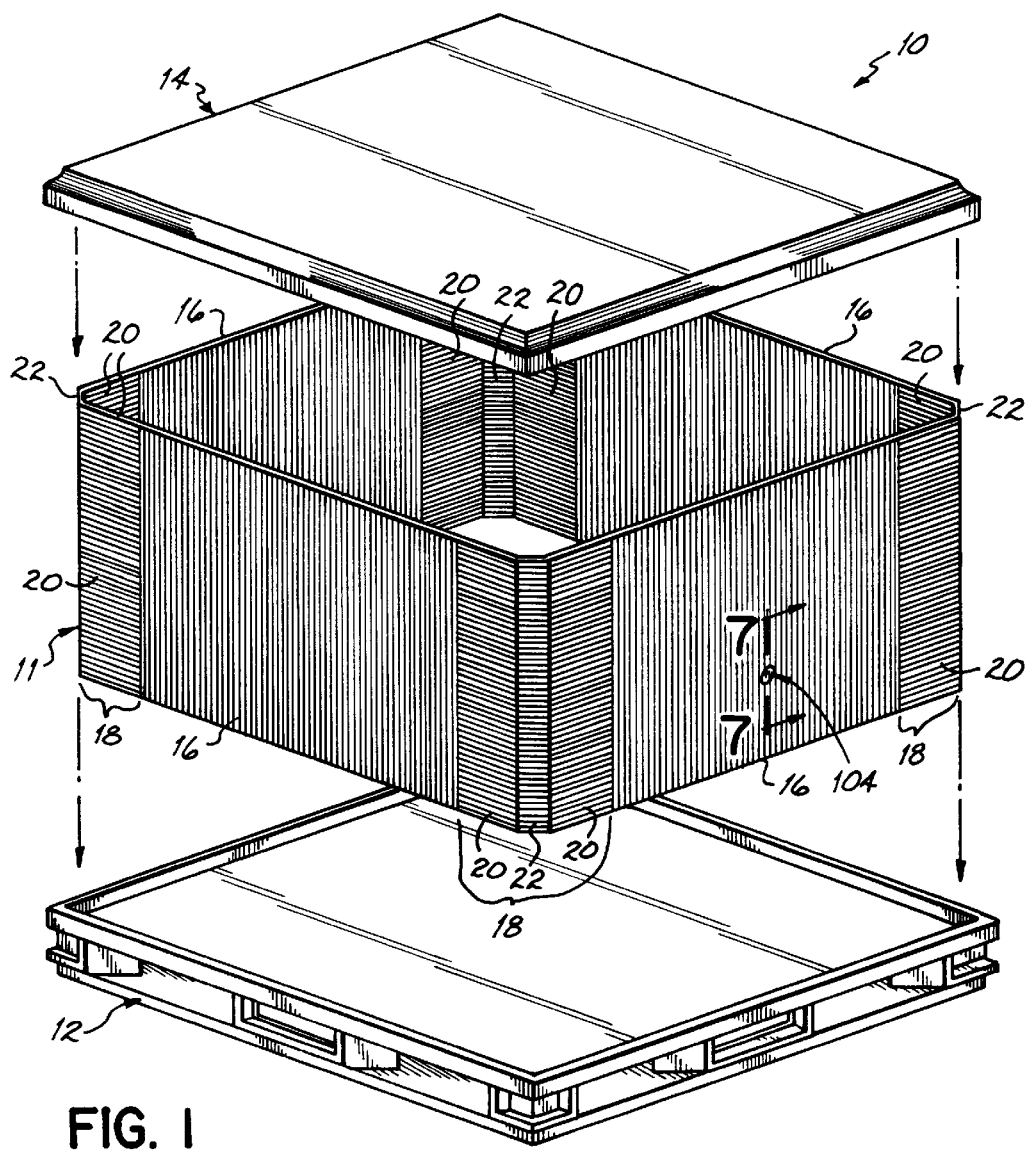
FIG. 1 is an exploded perspective view of a sleeve pack assembly of the present invention.

Referring to the drawings, and particularly to FIG. 1, there is illustrated a sleeve pack assembly 10 comprising a sleeve pack 11, a pallet base 12, and a cover 14. The sleeve pack 11 sits on top of the pallet base 12 and a cover 14 is placed on the sleeve pack 11 to form a container for shipping bulk goods such as automobile parts or different assembly items.

The sleeve pack of the present invention, illustrated in FIG. 1, is a single ply sleeve pack made of double face corrugated plastic. Double face corrugated plastic comprises a corrugated center section sandwiched between two flat plastic planar boards. The sleeve pack 11 comprises four vertical wall panels 16, four corner pieces 18, each corner piece 18 being located between two adjacent vertical wall panels 16. The vertical wall panels 16 are oriented such that each vertical wall panel 16 is orthogonal to the two adjacent vertical wall panels, configuring the wall panels 16 into a generally rectangular sleeve. Each corner piece 18 has three panels, two corner panels 20 and a connector panel 22. Each corner and connector panel has an inner face 24, outer face 26 and two opposed vertical side edges (not shown). Each vertical side edge of the connector panel 22 abuts in an edge-to-edge relation and is connected to a vertical side edge of a corner panel 20 by a score line such that the connector panel 22 is sandwiched between two corner panels 20. The three panels of a corner piece 18 are configured such that the two corner panels 20 of each corner piece 18 are orthogonal to each other and each corner panel 20 is at an obtuse angle to the connector panel 22 of the corner piece 18. The vertical side edge of the corner panel 20 which is not connected to the connector panel 22 abuts and is butt welded to a vertical side edge of a vertical wall panel 16. These edge-to-edge welds enable the sleeve pack to be of a generally rectangular configuration.

Each corner piece 18 is made of corrugated plastic having horizontal corrugations for side impact resistance to absorb shock when something hits the sleeve pack such as a forklift. The horizontal corrugations enable the plastic to bend inwardly without breaking, cracking or permanently deforming.

Each vertical wall panel 16 is made of corrugated plastic having vertical corrugations for improved stacking strength enabling multiple sleeve packs to be placed on top of one another even when full of parts.

A vertical side edge of each wall panel 16 is placed in an edge-to-edge relationship with a side edge of a corner piece 18, the two edges abutting one another and being butt welded together. The two edges are joined together in the same plane and permanently attached. Such an attachment between wall panels 16 creates a single ply sleeve pack 11 which fits inside an edge of a pallet base 12 more snugly than if the wall panels 16 were overlapped as in previous sleeve packs.

Another advantage of the one ply sleeve pack of the present invention is that there are no protruding edges which may catch clothing or a forklift arm. Previous sleeve packs with overlapping wall panels often had the problem of catching the edge of a forklift or clothing, tearing or destroying the sleeve pack. Another advantage of the single ply sleeve pack utilizing edge-to-edge welding is that less material is used for construction thereby reducing the cost. More precise wall panels can be cut of the corrugated plastic and their edges welded together with more precision than was heretofore possible with the overlapping sleeve pack design. The edge-to-edge joints between wall panels and corner pieces create a better seal than overlapping wall panels which heretofore utilized sonic spot welds which permitted water to enter the sleeve pack between the welds of the overlap. The edge-to-edge connections prevent water from entering the sleeve pack and therefore protect the contents inside the sleeve pack.

Unique to this invention is the idea of combining a piece of corrugated plastic having vertical corrugations with a piece of corrugated plastic having horizontal corrugations in an edge-to-edge butt welded relationship. The capability to join a wall panel of corrugated plastic having vertical corrugations with a corner piece of corrugated plastic having horizontal corrugations results in a sleeve pack of great vertical stacking strength as well as horizontal side impact resistance.

An alternative embodiment of the present invention utilizes a sleeve pack having two ply wall panels rather than only one ply wall panels of the first preferred embodiment depicted in FIG. 1. This alternative embodiment combines plastic with horizontal corrugations for side impact resistance and plastic with vertical corrugations for stacking strength in the same sleeve pack for superior results.

Figure 2:
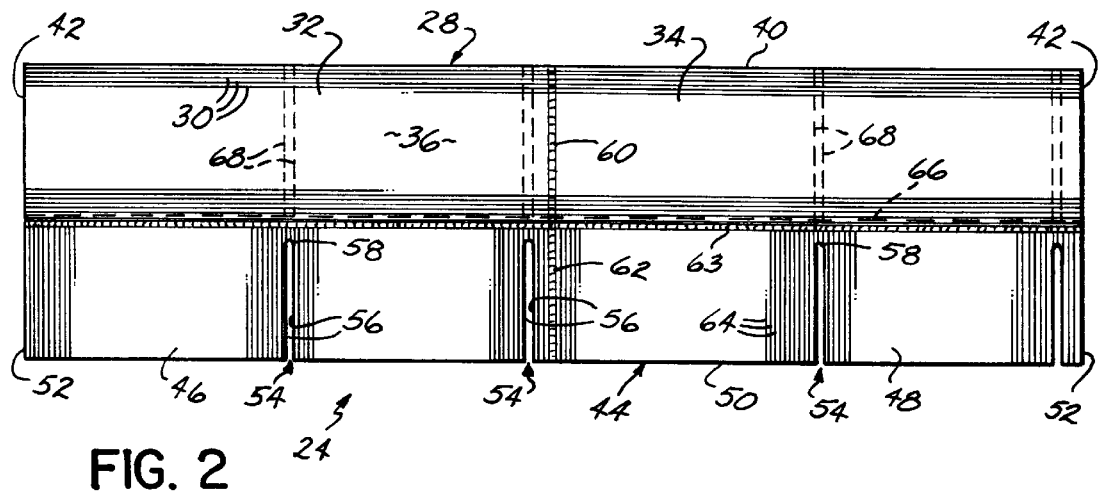
FIG. 2 is a side view of a continuous blank of corrugated plastic which is folded to make a two ply embodiment of the present invention.

As shown in FIG. 2 a generally rectangular one piece blank 24 of double face corrugated plastic is formed into a two ply sleeve pack 26 of one alternative embodiment of the present invention. The blank 24 of corrugated plastic is made up of a top half 28 of corrugated plastic having horizontal corrugations 30. The top half 28 of the blank 24 is made up of two pieces, a first piece 32 and a second piece 34. Each piece 32 and 34 has an outer face 36, inner face (not shown), a top edge 40, a bottom edge (not shown) and two vertical side edges 42. The abutting vertical side edges 42 of the top two pieces 32, 34 are welded together to form the top half 28 of the blank 24.

The bottom half 44 of the blank 24 is formed by combining a third piece 46 and a fourth piece 48, both made of corrugated plastic having vertical configurations 64. Each piece 46 and 48 has a top edge (not shown), a bottom edge 50 and two vertically opposed side edges 52. As in making the top half 28 of the blank 24, the bottom half of the blank 44 is made by combining and welding together adjacent opposed vertical side edges 52 of the third and fourth pieces 46 and 48.

Each piece 46 and 48 of the bottom half 44 of the blank 24 has two cut-out vertical slots 54. Each slot 54 has two slot walls 56 and a slot end 58 which is rounded. Each slot 54 extends from the bottom edge 50 of the pieces 46 and 48 upwards to proximate the top edge of the pieces 46 and 48. The pieces 32 and 34 of the top half 28 of the blank are joined together by a vertical butt weld line 60. The pieces 46 and 48 of the bottom half 44 of the blank 24 are also joined by a vertical butt weld line 62. Vertical butt weld lines 60 and 62 are lined up to be co-linear when the top and bottom halves of the blank are combined.

The top and bottom halves of the blank 24 are placed on top of one another with the lower edge of the top half abutting the top edge of the bottom half 44 of the blank weld 24. The halves are welded together along a horizontal butt weld line 63, thus creating a full blank 24.

Once the full blank 24 has been assembled from the four pieces it is then folded along a horizontal score line 66 which is parallel to and just above the horizontal butt weld line 63. The top half 28 of the blank 24 may be folded inwardly or outwardly of the bottom half 44 depending upon whether horizontal corrugations 34 are desired on the inside or the outside of the two ply sleeve pack 26. If horizontal corrugations are desired on the inside ply of the two-ply wall panels and vertical corrugations on the outside ply then the top half 28 of the sleeve pack is bent inwardly along the horizontal score line 66 so that the inner face of the top half 28 of the blank 24 contacts the inner face of the bottom half 44 of the blank 24. The top edge 40 of the first and second pieces 32 and 34 of the blank 24 then becomes co-planer with the bottom edge 50 of the lower two pieces 46 and 48 of the blank 24. A two-ply blank is thus formed.

Figure 3:
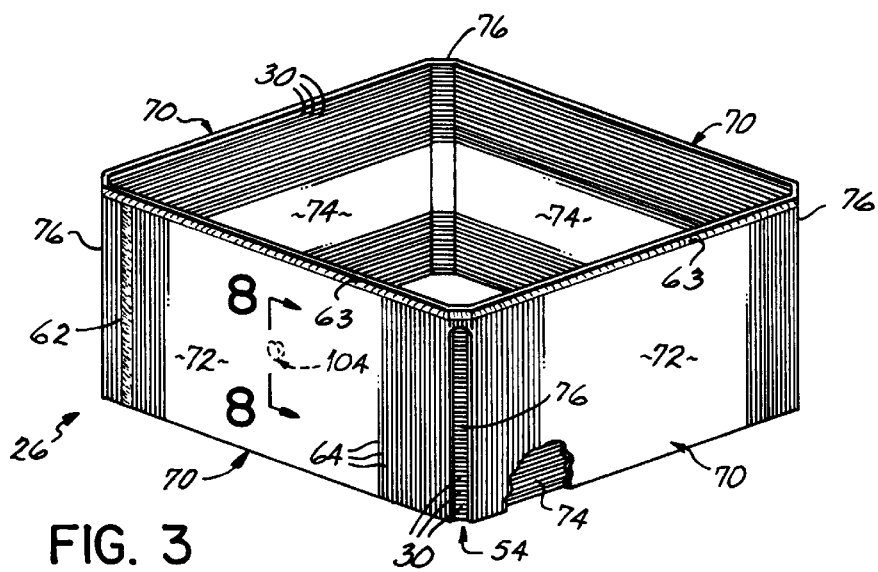
FIG. 3 is a perspective view of a two ply sleeve pack of the present invention, each wall panel comprising an inner ply having horizontal corrugations and an outer ply having vertical corrugations.

To form the two-ply sleeve pack of FIG. 3 the two ply blank is folded along eight vertical score lines 68 which are co-linear with the slot walls 56 of the slots 54 to create four two ply wall panels 70. Each two-ply panel 70 is defined between two slots 54. Each two ply wall panel 70 has an outer ply 72 and an inner ply 74. In this second embodiment of the invention shown in FIG. 3 the outer ply 72 of each wall panel has vertical corrugations 64 and the corresponding inner ply 74 of each wall panel has horizontal corrugations 30. The horizontal weld line 63 appears on the top outer surface of the outer ply 72. Looking at the sleeve pack, one can see the horizontal corrugations 30 of the inner ply 74 through the four slots 54 in the outer ply 72, one slot 54 being located at each of the four corners 76 of the two-ply sleeve pack 26.

The last step in the assembly of the two ply sleeve pack is to butt weld the vertical side edges of the two-ply blank together. Once the two ply blank is bent along the vertical score lines 68, the vertical side edges 42, 52 of the two ply blank are butt welded together in edge-to-edge relationship to complete the assembly of the two ply sleeve pack. The weld used is the same weld as is used to combine the four individual pieces 32, 34, 46 & 48 of the blank 24.

Figure 4:
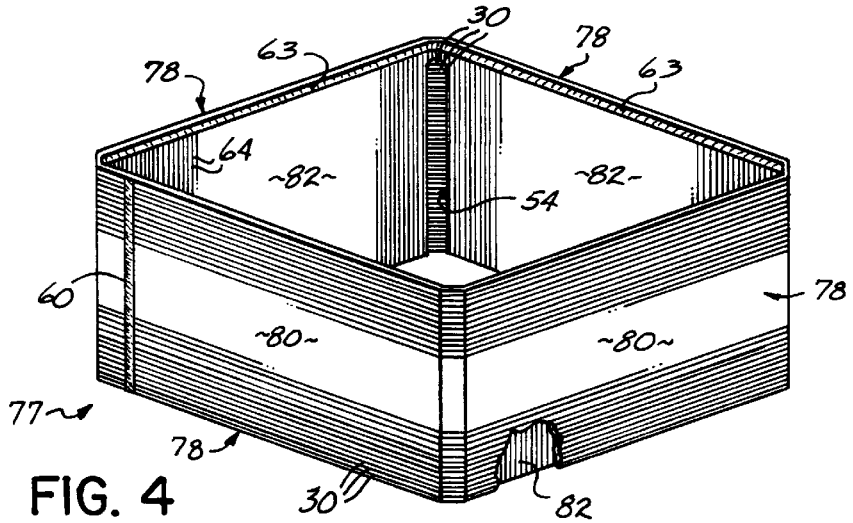
FIG. 4 is a perspective view of the two ply sleeve pack of the present invention with the inner ply of each wall panel having vertical corrugations and the outer ply of each wall panel having horizontal corrugations.

A third embodiment of the present invention is a two-ply sleeve pack 77 illustrated in FIG. 4. This embodiment comprises four orthogonal, two ply wall panels 78, each wall panel having an outer ply 80 and an inner ply 82 as in the embodiment illustrated in FIG. 3. The outer ply 80 has horizontal corrugations 30 for side impact resistance and the inner ply 82 has vertical corrugations 64 for stacking strength. This embodiment is formed the same way as is the two-ply sleeve pack 26 of FIG. 3 except that the top half 28 of the blank 24 is folded outside of the bottom half 44 of the blank 24 so that the two-ply blank has horizontal corrugations 30 on the outside ply and vertical corrugations 64 on the inside ply. The slots 54 are located on the inside ply 82 of the wall panels 78 at the corners thereof and the horizontal butt weld line 63 is hidden from view on top of the inside ply 82.

Figure 5:
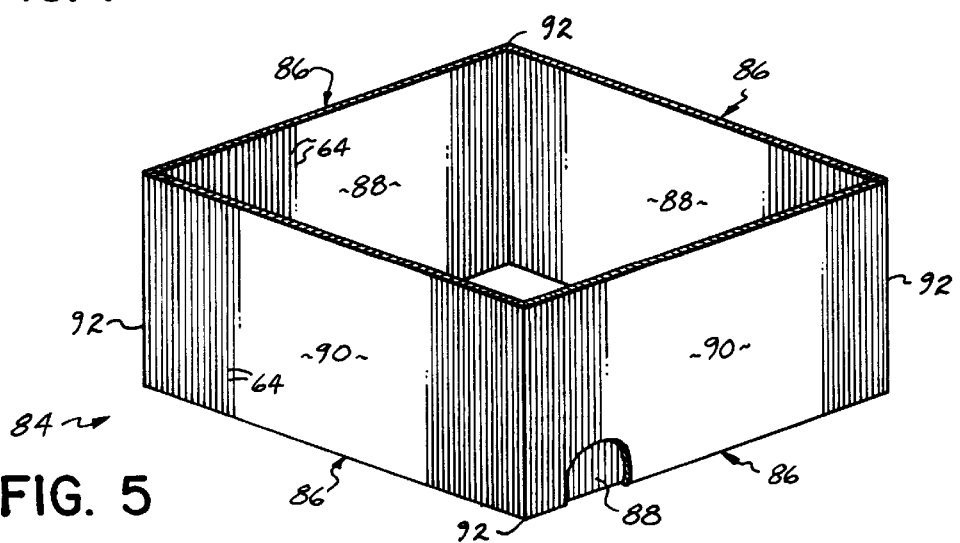
FIG. 5 is a perspective view of a two ply sleeve pack of the present invention with wall panels having vertical corrugations on both the inner and outer plies of each wall panel.

FIG. 5 illustrates another embodiment of the present invention. A two ply sleeve pack 84 is illustrated having four two ply wall panels 86, each wall panel 86 consisting of an inner ply 88 having vertical corrugations 64 and an outer ply 90 also having vertical corrugations 64. The corners 92 are scored and sharp or at right angles with each wall panel 86 directly orthogonal to an adjacent wall panel 86.

Figure 6:
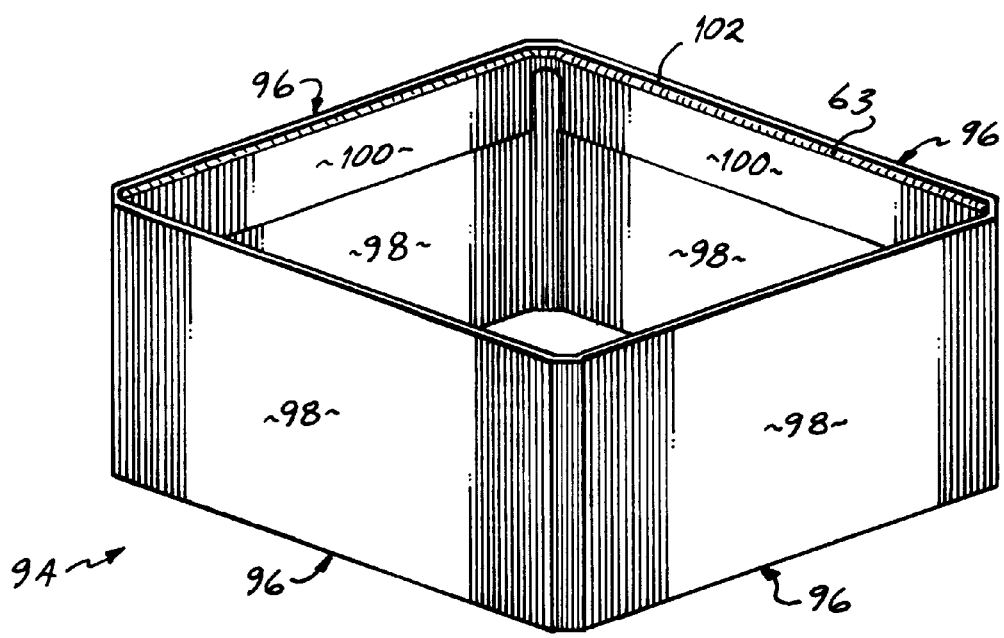
FIG. 6 is a perspective view of a two ply sleeve pack of the present invention with the inner ply of each wall panel only extending partially down the wall panel.

FIG. 6 illustrates an alternative sleeve pack 94 having four two ply wall panels 96, each wall panel having an outer ply 98 and an inner ply 100. The inner ply 100, rather than extending all the way down to the bottom of the outer ply 98 extends downward only a portion of the height of the outer ply 98. This enables the top edge 102 of the sleeve pack 94 to be reinforced without the entire wall panel 96 being reinforced. Such a design reduces the amount of material needed to construct a sleeve pack and lowers the cost while still providing very nearly all of the resistance to horizontal collapse as the same sleeve pack but with both plays of each wall extending for the full height of the wall as shown in FIG. 4.

Figure 7:
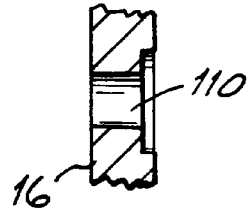
FIG. 7 is a cross-sectional view taken along the line 7—7 of FIG. 1.
Figure 8:
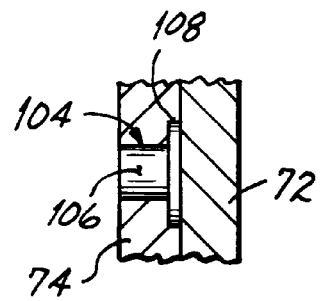
FIG. 8 is a cross-sectional view taken along the line 8—8 of FIG. 3.

All of the embodiments of the present invention described hereinabove preferably have incorporated into one or more of the sleeve pack walls or connector panels a radio frequency identification device (RFID) 104. A RFID 104 is a small device which has a cylindrical body 106 with a flange 108 on one end of the body 106. The length of the RFID is approximately the thickness of one ply of corrugated plastic, as illustrated in FIGS. 7 and 8. The flange 108 prevents the RFID from moving outwardly and falling out of the sleeve pack. In a two-ply sidewall panel, as illustrated in FIG. 8, the inner ply prevents the RFID from moving inwardly and secures the RFID in place. In a one ply sidewall panel, as illustrated in FIG. 7, the RFID is inserted in an embossed hole 10 in the sidewall panel and secured therein by any conventional securement such as adhesive.

In use a person desiring to identify the contents inside a sleeve pack assembly sends a signal via a conventional sender read out device to the sleeve pack which hits the RFID. Each RFID has a unique code. The RFID 104 in the sleeve pack reflects the signal back to the sender with the unique code imprinted upon the signal back to the read out so that individual sleeve packs may be identified and the contents therein identified. Such a sender read out device enables contents inside an RFID equipped sleeve pack assembly to be identified without taking off the cover of the sleeve pack assembly. All of the embodiments shown preferably utilize a RFID in either a wall panel or a corner piece of the sleeve pack.

While we have described several embodiments of the present invention, persons skilled in the art will appreciate changes and modifications may be made without departing from the invention of this application. For example, the inner ply of the two ply wall panel may extend down half way or three quarters of the way down to the bottom edge of the wall panel of the sleeve pack rather than one third of the way down to the bottom edge of the wall panel as illustrated in FIG. 6. Therefore, we intend to be limited only by the scope of the following claims.

Having described our invention we claim:

1. A sleeve pack to be used with a pallet base and a cover to form a container for shipping bulk goods, the sleeve pack comprising:

four vertical walls of corrugated plastic, each wall having an inner face, outer face, top and bottom edge, each wall being orthogonal to the two adjacent walls, said sleeve pack having an open top and open bottom, a portion of each wall having vertically oriented corrugations and a separate portion of each wall having horizontally oriented corrugations, the portion of each wall having vertically oriented corrugations being welded in edge-to-edge butt welded relationship to the portion of the same wall having horizontally oriented corrugations.

2. The sleeve pack of claim 1 further comprising a radio frequency identification device inserted into one of said walls.

3. The sleeve pack of claim 1 wherein the portion of the wall having vertically oriented corrugations and the portion of the wall having horizontally oriented corrugations are joined along a vertical weld line.

4. The sleeve pack of claim 1 wherein the portion of the wall having vertically oriented corrugations and the portion of the wall having horizontally oriented corrugations are joined proximate a corner of said sleeve pack.

5. The sleeve pack of claim 4 wherein a radio frequency identification device is inserted into a wall of said sleeve pack.

6. A sleeve pack to be used with a pallet base and cover to form a container for shipping bulk goods, the sleeve pack comprising:

four rectangular vertical wall panels each having an inside face, an outside face and two opposed vertical side edges;

four corner pieces attached to the side edges of the wall panels to configure the vertical wall panels into a generally rectangular sleeve, each corner piece comprising two corner panels connected by a connector panel, each corner and connector panel having an inner and outer face and two opposed vertical side edges, the two corner panels and connector panel of each corner piece being oriented such that the corner panels of each corner piece are orthogonal to each other and each corner panel is at an obtuse angle to the connector panel;

each vertical wall panel being made of corrugated plastic with the corrugations being vertical;

each corner piece being made of corrugated plastic with the corrugations being horizontal; and a vertical side edge of each corner panel abutting and being welded in an edge-to-edge relationship to a vertical side edge of a vertical wall panel.

7. The sleeve pack of claim 6 wherein the two corner panels of each corner piece are identically configured.

8. The sleeve pack of claim 6 wherein a radio frequency identification device is inserted in a wall of the sleeve pack.

9. The sleeve pack of claim 6 wherein a radio frequency identification device is inserted in a connector panel of the sleeve pack.

10. A sleeve pack to be used with a pallet base and cover to form a container for shipping bulk goods, the sleeve pack having an open top and an open bottom, the sleeve pack comprising:

four continuous planar two-ply generally rectangular wall panels, each ply of each wall panel being formed of double face corrugated plastic, each wall panel being defined between two vertical slots, and two score lines which are generally co-linear with the vertical slots, the vertical slots and score lines being at the corners of the sleeve pack, each wall panel having an inner ply, an outer ply, a top edge and a bottom edge, the top edge of each wall panel being co-planar and the bottom edge of each wall panel being co-planar, and at least one wall panel being formed of at least two pieces of corrugated plastic joined together in an edge-to-edge butt welded relationship.

11. The sleeve pack of claim 10 wherein at least one ply of at least one wall panel of corrugated plastic has vertically oriented corrugations.

12. The sleeve pack of claim 10 wherein the vertical slots extend upwards from a bottom edge of the sleeve pack to proximate a top edge of the sleeve pack.

13. The sleeve pack of claim 10 wherein a radio frequency identification device is inserted into at least one of the wall panels.

14. The sleeve pack of claim 10 wherein the inner ply of each two-ply generally rectangular wall panel has horizontally oriented corrugations and the outer ply of each two-ply generally rectangular wall panel has vertically oriented corrugations.

15. The sleeve pack of claim 10 wherein the inner ply of each two-ply generally rectangular wall panel has vertically oriented corrugations and the outer ply of each vertical wall panel has horizontally oriented corrugations.

16. The sleeve pack of claim 15 wherein the inner ply of each two-ply generally rectangular wall panel extends downward from the top edge of each two-ply generally rectangular wall panel to the bottom edge of each two-ply generally rectangular wall panel.

17. The sleeve pack of claim 15 wherein the inner ply of each two-ply generally rectangular wall panel extends downward from the top edge of each two-ply generally rectangular wall panel to a point above the middle of each two-ply generally rectangular wall panel.

18. A generally rectangular sleeve pack having an open top and open bottom and comprising:

four continuous wall panels, each wall panel having an inner ply and an outer ply, said inner and outer plies being defined by folding a sheet of corrugated plastic along a horizontal fold line, such that said inner and outer plies are connected to each other along said horizontal fold line wherein a portion of each wall panel has horizontally oriented corrugations and a separate portion of the wall panel has vertically oriented corrugations.

19. A generally rectangular sleeve pack having an open top and open bottom, the sleeve pack further comprising:

four continuous wall panels, each wall panel having an inner ply, an outer ply, top edge and bottom edge, said inner and outer plies being defined by folding a sheet of corrugated plastic along a horizontal fold line, at least one of said wall panels comprising at least two pieces of corrugated plastic joined together in edge-to-edge butt welded relationship wherein the outer plies of the wall panels have horizontally oriented corrugations.

20. A generally rectangular sleeve pack having an open top and open bottom, the sleeve pack further comprising:

four continuous wall panels, each wall panel having an inner ply, an outer ply, top edge and bottom edge, said inner and outer plies being defined by folding a sheet of corrugated plastic along a horizontal fold line, at least one of said wall panels comprising at least two pieces of corrugated plastic joined together in edge-to-edge butt welded relationship wherein the inner plies of the wall panels have horizontally oriented corrugations and the outer plies of the wall panels have vertically oriented corrugations.

21. A generally rectangular sleeve pack having an open top and open bottom, the sleeve pack further comprising:

four continuous wall panels, each wall panel having an inner ply, an outer ply, top edge and bottom edge, said inner and outer plies being defined by folding a sheet of corrugated plastic along a horizontal fold line, at least one of said wall panels comprising at least two pieces of corrugated plastic joined together in edge-to-edge butt welded relationship wherein the inner ply of each wall panel extends downward to a point above the bottom edge of the wall panel.

22. The sleeve pack of claim 21 wherein at least one wall panel has a radio frequency identification device inserted therein.

23. A method of making a sleeve pack having an open top and open bottom to be used with a pallet base and a cover to form a container for shipping bulk goods, comprising the steps of:

butt welding four generally rectangular pieces of corrugated plastic together into a blank in edge-to-edge relationship, the blank having an inner face, outer face, an upper and lower edge and two opposed side edges, two of the pieces of corrugated plastic having horizontal corrugations parallel the upper and lower edges of the blank and two of the pieces of corrugated plastic having vertical corrugations parallel the side edges of the blank, each piece having vertical corrugations having two cut-out vertical slots separating the piece into two wall panels, each slot extending from the lower edge of the piece of corrugated plastic to proximate the upper edge of the piece of corrugated plastic and having two slot walls;

folding the blank along a horizontal fold line in order to form a two-ply blank, the two-ply blank having a top and bottom edge, inner and outer face and two opposed vertical side edges;

folding the two-ply blank along vertical fold lines creating four two-ply wall panels;

butt welding the two vertical side edges of the two-ply blank together creating a generally rectangular two-ply sleeve pack assembly.

24. The method of making a sleeve pack of claim 23 wherein the step of joining the four pieces of corrugated plastic together comprises placing the two pieces having horizontal corrugations together such that their opposing side edges abut one another in a face-to-face relationship and welding the pieces together along a vertical butt weld line to form a top half of the blank, the top half of the blank having a top and bottom edge, inner and outer face and two opposed side edges.

25. The method of making a sleeve pack of claim 24 wherein the step of joining the four pieces of corrugated plastic together comprises placing the two pieces having vertical corrugations together such that their opposing side edges abut one another in a face-to-face relationship and butt welding them together along a vertical butt weld line to form a bottom half of the blank, the bottom half of the blank having a top and bottom edge, inner and outer face and two opposed side edges.

26. The method of making a sleeve pack of claim 25 wherein the step of joining the four pieces of corrugated plastic together comprises placing the two halves of the blank such that the bottom edge of the top half of the blank abuts the top edge of the bottom half of the blank in a face-to-face relationship and butt welding the halves together along a horizontal butt weld line.

27. The method of making a sleeve pack of claim 23 wherein the step of folding the blank along a horizontal fold line comprises folding the top half of the blank so that the inner face of the two-ply blank has horizontal corrugations and the outer face of the two-ply blank has vertical corrugations.

28. The method of making a sleeve pack of claim 23 wherein the step of folding the blank along a horizontal fold line comprises folding the top half of the blank downward such that the inner face of the top half of the blank contacts the inner face of the bottom half of the blank.

29. The method of making a sleeve pack of claim 28 wherein the step of folding the blank along a horizontal fold line comprises folding the top half of the blank downward so that the top edge of the blank becomes a part of the bottom edge of the two-ply blank.

30. The method of making a sleeve pack of claim 23 wherein the step of folding the blank along a horizontal fold line comprises folding the top half of the blank so that the outer face of the two-ply blank has vertical corrugations and the inner face of the two-ply blank has horizontal corrugations.

31. The method of making a sleeve pack of claim 23 wherein the step of folding the blank along a horizontal fold line comprises folding the top half of the blank downward such that the outer face of the top half contacts the outer face of the bottom half of the blank.

32. The method of making a sleeve pack of claim 23 wherein the step of folding the blank along a horizontal fold line comprises folding the top half of the blank downward such that the top edge of the blank becomes a part of the bottom edge of the two-ply blank.

33. A method of making a sleeve pack, the sleeve pack having an open top and an open bottom and comprising four rectangular two-ply wall panels to be used with a pallet base and a cover to form a container for shipping bulk goods, comprising the steps of:

providing four generally rectangular pieces of corrugated plastic, each piece of corrugated plastic having an inner face, outer face, a width defined between an upper and lower edge, and a length defined between two opposed side edges, the length of each piece being greater than the width, two of the pieces having horizontal corrugations parallel the upper and lower edges of the piece and two of the pieces having vertical corrugations parallel the opposed side edges of the piece, the two pieces having vertical corrugations each having two cut-out slots extending from the lower edge of the piece to proximate the upper edge of the piece, each slot having two slot walls;

orienting the two pieces of corrugated plastic having horizontal corrugations beside one another with opposing side edges abutting, the two pieces having vertical corrugations beside one another with opposing side edges abutting and the lower edge of each piece having horizontal corrugations abutting the upper edge of the piece having vertical corrugations immediately therebelow;

butt welding adjacent pieces along the abutments into a blank;

folding the blank along a horizontal fold line, creating a two-ply blank, the two-ply blank having an upper and lower edge, inner and outer face and two opposed vertical side edges;

folding the two-ply blank along vertical fold lines creating four wall panels of double wall thickness;

butt welding the two vertical side edges of the two-ply blank.

34. The method of making a sleeve pack of claim 33 wherein the step of butt welding adjacent pieces comprises butt welding the two pieces having horizontal corrugations together along a vertical weld line to make a top half of the blank, butt welding the two pieces having vertical corrugations together along a vertical weld line to form a bottom half of the blank and welding the two halves of the blank together along a horizontal weld line to make a blank.

35. The method of making a sleeve pack of claim 33 wherein the step of folding the blank along a horizontal fold line comprises folding the top half of the blank inside the bottom half of the blank so that the inner ply of the two-ply blank has horizontal corrugations and the outer ply of the two-ply blank has vertical corrugations.

36. The method of making a sleeve pack of claim 33 wherein the step of folding the blank along a horizontal fold line comprises folding the top half of the blank over the bottom half of the blank so that the inner ply of the two-ply blank has vertical corrugations and the outer ply of the two-ply blank has horizontal corrugations.

37. The method of making a sleeve pack of claim 33 wherein the step of folding the blank along vertical fold lines comprises folding two-ply blank such that each vertical fold line is co-linear with a slot wall.

38. A method of making a sleeve pack having an open top and open bottom to be used with a pallet base and a cover to form a container for shipping bulk goods, comprising the steps of:

joining four generally rectangular wall panels, each wall panel being made of corrugated plastic having vertically oriented corrugations to four corner pieces, each corner piece being made of corrugated plastic having horizontally oriented corrugations, to form a generally rectangular sleeve by abutting a vertical side edge of a wall panel to a vertical side edge of a corner piece adjacent to the wall panel and butt welding them together.

39. The method of claim 38 further comprising the step of:
inserting a radio frequency identification device into a portion of at least one of said walls in order to aid in the identification of the contents inside the container.

40. A generally rectangular sleeve pack to be used with a pallet base and cover to form a container for shipping bulk goods, the sleeve pack comprising:

four vertical walls, at least one wall comprising a first and second piece of corrugated plastic joined together in edge-to-edge butt welded relationship, said first piece having vertically oriented corrugations and said second piece having horizontally oriented corrugations, wherein said at least one wall of said sleeve pack comprises a third piece of corrugated plastic.

41. The sleeve pack of claim 40 wherein said first piece of corrugated plastic is located between and welded to said second and third pieces of corrugated plastic.

42. A plastic sleeve pack to be used with a pallet base and cover to form a container for shipping bulk goods, the sleeve pack comprising:

four vertically oriented plastic corrugated wall panels, each wall panel having vertically oriented corrugations and two opposed vertical side edges;

four corner pieces butt welded to the side edges of the wall panels to configure the wall panels into a generally rectangular sleeve, each corner piece being of corrugated plastic with horizontally oriented corrugations; and a vertical side edge of each corner panel abutting and being welded in edge-to-edge relationship to a vertical side edge of a wall panel.

43. The sleeve pack of claim 42 wherein a radio frequency identification device is inserted in a wall panel of the sleeve pack.

44. The sleeve pack of claim 42 wherein a radio frequency identification device is inserted in a corner piece of the sleeve pack.

45. A method of making a sleeve pack having an open top and an open bottom to be used with a pallet base and a cover to form a container for shipping bulk goods, comprising the steps of:

butt welding four corner pieces of corrugated plastic together in edge-to-edge relationship with four generally rectangular wall panels of corrugated plastic wherein said wall panels have corrugations oriented a first direction and said corner pieces have corrugations oriented a second direction.

46. The method of making a sleeve pack of claim 45 further comprising the step of inserting a radio frequency identification device into one of said pieces.

\* \* \* \* \*